(12) United States Patent
Fujita

(10) Patent No.: US 7,382,697 B2
(45) Date of Patent: Jun. 3, 2008

(54) OPTICAL DISK APPARATUS

(75) Inventor: Yoshikazu Fujita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 581 days.

(21) Appl. No.: 11/133,328

(22) Filed: May 20, 2005

(65) Prior Publication Data

US 2005/0259528 A1    Nov. 24, 2005

(30) Foreign Application Priority Data

May 21, 2004   (JP)   ............................. P2004-152246

(51) Int. Cl.
*G11B 7/00*    (2006.01)
(52) U.S. Cl. ................................... 369/44.28
(58) Field of Classification Search ............. 369/44.27, 369/44.28, 44.32, 44.29, 44.34
See application file for complete search history.

(56) References Cited

U.S. PATENT DOCUMENTS 5,121,373 A * 6/1992 Barton et al. ............ 369/44.28

FOREIGN PATENT DOCUMENTS

| JP | 08-190771 | 7/1996 |
|----|-----------|--------|
| JP | 2001/176090 | 6/2001 |
| JP | 2002/329334 | 11/2002 |

* cited by examiner

*Primary Examiner*—Nabil Z. Hindi
(74) *Attorney, Agent, or Firm*—Morgan, Lewis & Bockius LLP

(57) ABSTRACT

A seek control unit increments by a first magnitude the maximum speed when the pickup head is moved while the number of jumped tracks can be counted appropriately. If the number of tracks jumped during seek could not be counted appropriately, the seek control unit decrements the maximum speed by a second magnitude. The seek control unit sets the maximum speed stored in a speed information storage device 8 for a marginal speed. Once set for the marginal speed, the seek control unit, even when the number of jumped tracks can be counted appropriately, does not execute updating of incrementing the maximum speed stored in the speed information storage unit.

5 Claims, 3 Drawing Sheets

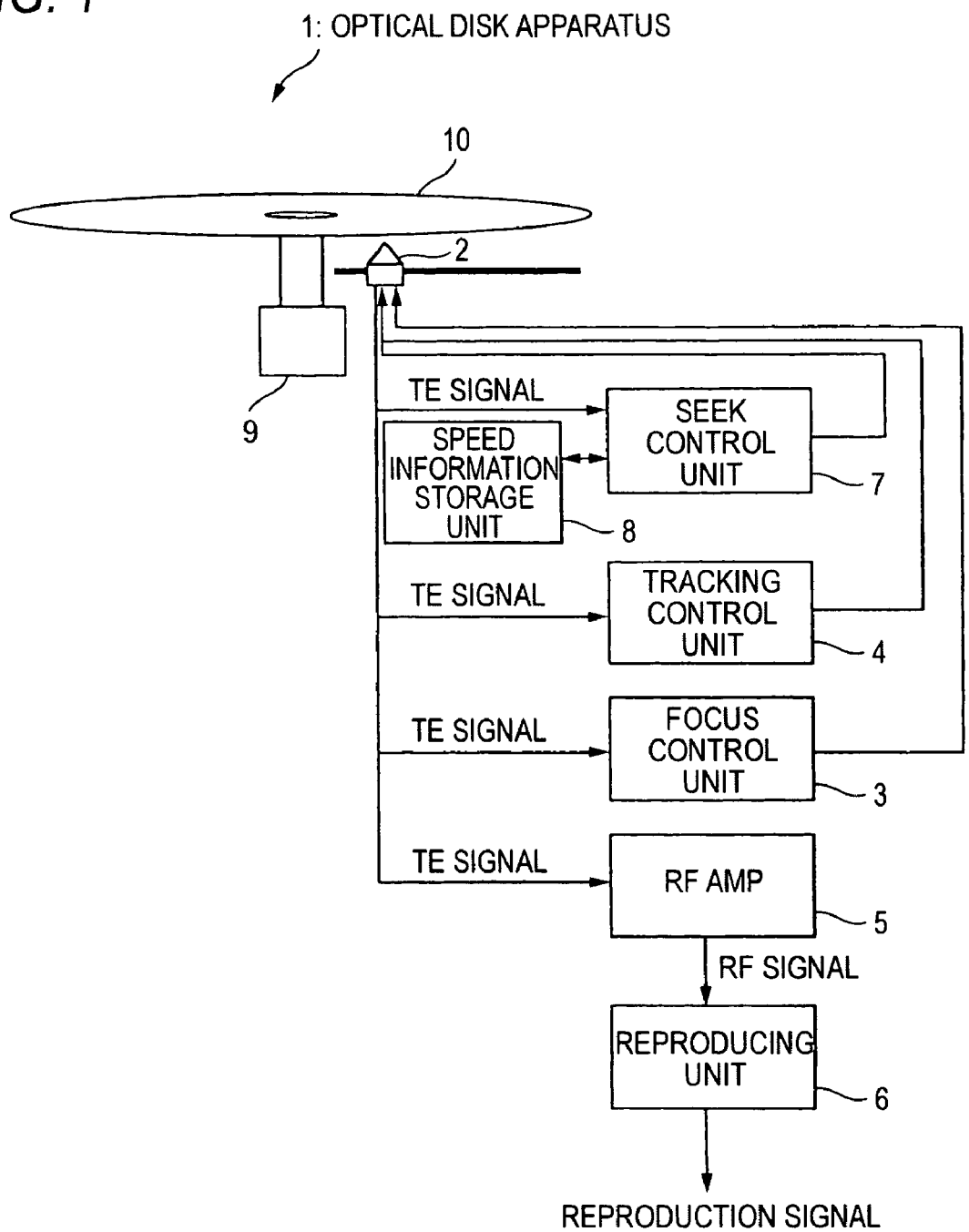

OPTICAL DISK APPARATUS

BACKGROUND OF THE INVENTION

1. Field of the Invention

This invention relates to an optical disk apparatus for reading data recorded on an optical disk such as a CD or DVD and reproducing the read data.

2. Description of the Related Art

Conventionally, an optical disk apparatus has generally become widespread which reads data recorded on an optical disk such as a CD or DVD and produces a reproduced signal of a voice or image based on the data thus read. The optical disk apparatus, as well known, is provided with a pickup head which irradiates the optical disk set in the apparatus body with a laser beam and detects the reflected beam as a read signal of the data recorded on the optical disk. The pickup head is movably attached in a radial direction of the optical disk set in the apparatus body. The optical disk apparatus controls a data reading position (where the optical disk is radiated with the laser beam and the reflected beam is detected) on the optical disk by moving the pickup head in the radial direction of the optical disk. In a conventional optical disk apparatus, when seek is carried out to move the data reading position on the optical disk from a present position to a remote position (hereinafter referred to as a target position), as described in JP-A-8-190771 and JP-A-2001-176090, the pickup head is moved in the radial direction of the optical disk at a predetermined moving speed according to the number of moving tracks.

Meanwhile, the optical disk apparatus provides variations in the moving speed of the pickup head permitting appropriate seek among apparatuses owing to variations in the performance of the components used. So in the method of presetting the moving speed of the pickup head during seek disclosed in JP-A-8-190771 and JP-A-2001-176090, taking into consideration the variations of the performance of the components used, the moving speed of the pickup head must be set for a speed lower to a certain extent than the maximum speed permitting the appropriate seek. Thus, the time taken for seek cannot be sufficiently shortened. In order to obviate such an inconvenience, JP-A-2002-329334 proposes a technique in which if seek has succeeded, the moving speed of the pickup head during the subsequent seek is incremented by a predetermined magnitude, and on the contrary, if the seek has failed, the moving speed of the pickup head during the subsequent seek is decremented by a predetermined magnitude.

SUMMARY OF THE INVENTION

However, the configuration proposed in JP-A-2002-329334, in which if seek has succeeded, the moving speed of the pickup head during the subsequent seek is incremented by a predetermined magnitude, and on the contrary, if the seek has failed, the moving speed of the pickup head during the subsequent seek is decremented by a predetermined magnitude, has the following disadvantage. In this configuration, after the moving speed of the pickup head has been set for the marginal speed permitting the appropriate seek, when the seek is executed at this limiting speed, the moving speed of the pickup head during the subsequent seek is set for the speed exceeding the marginal speed so that the seek in the subsequent seek will fail. And the moving speed of the pickup head in the subsequent seek is restored to the marginal speed so that seek subsequent to the seek failed will succeed. Thus, the moving speed of the pickup head is set again at the speed exceeding the marginal speed. In this way, when seek is executed, the moving speed of the pickup head during seek is alternately set between the marginal speed and the speed exceeding it so that whenever seek is executed, success and failure are repeated. Accordingly, the seek fails at a high frequency (every other seek). This leads to a problem of deteriorating the reliability of the apparatus body.

Incidentally, when the seek fails, the pickup head moves to a target position after having executed the seek. This lengthens the time taken for the seek.

An object of this invention is to provide an optical disk apparatus which can set the moving speed of a pickup head during seek according to an apparatus body and suppress the frequency of seek failure to prevent reliability of the apparatus body from being deteriorated.

In order to solve the above problems, the optical disk apparatus according to this invention has the following configurations.

(1) According to one aspect of the invention, the optical disk apparatus including: a moving device for moving a pickup head in a radial direction of an optical disk, the pickup head for reading data recorded on the optical disk by irradiating the optical disk set in an apparatus body with a laser beam and detecting the beam reflected therefrom, a seek control device for controlling movement of the pickup head by the moving device during seek of jumping a data reading position on the optical disk, and a reproducing device for creating and outputting a reproduced signal based on the data read from the optical disk by the pickup head, the apparatus further including a speed information storage device for storing speed information composed of information of a maximum speed which is an upper limit of the moving speed of the pickup head during seek and information indicative of that the maximum speed is a marginal speed, both items of information being correlated with each other, wherein the seek control device counts the number of tracks jumped while controlling the movement of the pickup head by the moving device so that that the moving speed of the pickup head during seek does not exceed the maximum speed; acquires a difference between the number of tracks actually jumped when jumping is completed and the number of tracks counted this time; where the difference acquired is smaller than a determining number of tracks computed on the basis of the number of tracks actually jumped, if the pickup head has been moved at the maximum speed during the present jumping, updates the maximum speed of the pickup head stored in the speed information storage device to a speed incremented by a first prescribed magnitude; and on the contrary, where the difference acquired is larger than the determining number of tracks, if the corresponding maximum speed of the pickup head stored in the speed information storage device is not the marginal speed and if the pickup head has been moved at the maximum speed during the present jumping, updates the maximum speed of the pickup head stored in the speed information storage device to a speed decremented by a second prescribed magnitude; and if the maximum speed of the pickup head stored in the speed information storage device is not the marginal speed, sets the maximum speed for the marginal speed.

In this configuration, the seek control device controls the movement of the pickup head so that that the moving speed of the pickup head during seek does not exceed the maximum speed stored in the speed information storage device. The seek control device acquires a difference (absolute value) between the number of tracks actually jumped when jumping is completed and the number of tracks counted this time to determine whether or not the difference acquired is smaller than a determining number of tracks computed on the basis of the number of tracks actually jumped. The determining number of tracks may be computed, for example, by multiplying the number of tracks actually jumped by a prescribed ratio. This ratio may be the magnitude of e.g. 0.01 to 0.05 or so. If the difference between the number of tracks actually jumped and the number of tracks counted this time is larger than the determining number of tracks, the seek control device determines that the number of tracks jumped has not been counted appropriately, and if the difference between the number of tracks actually jumped and the number of tracks counted this time is smaller than the determining number of tracks, the seek control device determines that the number of tracks jumped has been counted appropriately.

If the number of tracks jumped has not been counted appropriately and if the pickup head has been moved at the maximum speed during the present jumping, the seek control device determines that the number of tracks jumped cannot be counted appropriately if the pickup head is moved at this maximum speed and updates the maximum speed stored in the speed information storage device to a speed decremented by the second magnitude. Further, if the maximum speed stored in the speed information storage device has not been set for the marginal speed, the maximum speed updated this time is set for the marginal speed.

If the number of tracks jumped has been counted appropriately and if the pickup head has been moved at the maximum speed during the present jumping, the seek control device determines that the number of tracks jumped can be counted appropriately if the pickup head is moved at this maximum speed. And if the maximum speed stored in the speed information storage has not been set for the marginal speed, the seek control device updates the maximum speed stored in the speed information storage device to a speed incremented by a first magnitude. If the maximum speed stored in the speed information storage has been set for the marginal speed, it has been already confirmed that if the pickup head is moved at the speed larger by the second magnitude than the maximum speed set at present, the number of tracks to jump cannot be counted appropriately. So the seek control device does not update the maximum speed stored in the speed information storage device.

In this way, while the number of tracks jumped during seek can be counted appropriately (the maximum speed is not set for the marginal speed), the maximum speed at which the pickup head is moved is being incremented by the first magnitude. For this reason, according to the performance of the components used in the apparatus body, the maximum speed at which the pickup head is moved during seek can be detected and set. Further, if the number of tracks jumped during seek cannot be counted appropriately and the maximum speed stored in the speed information storage device is set for the marginal speed, thereafter even if the number of tracks can be counted appropriately, the seek control device does not execute updating of incrementing the maximum speed stored in the speed information storage device. For this reason, a situation does not occur in which whenever seek is done, the maximum speed at which the pickup head is moved is alternately set between the speed not higher than the marginal speed and the speed higher than the marginal speed. This sufficiently suppresses the frequency of seek failure, thus preventing reliability of the apparatus body from being deteriorated.

Further, the speed information stored in the speed information storage device is updated only when the pickup head has been moved at the stored maximum speed during the present seek. In other words, if the pickup head has not been moved at the maximum speed stored in the speed information storage device and it cannot be confirmed whether or not the number of tracks jumped at the maximum speed can be counted appropriately, the speed information stored in the speed information storage device is not updated. For this reason, the speed information can be updated appropriately.

(2) In the optical disk apparatus, the speed information storage device stores the speed information according to the kind of the optical disk, and the seek control device executes the seek using the speed information stored in the speed information storage device according to the kind of the optical disk set in the apparatus body, and updates this speed information.

In this configuration, since the speed information is stored according to the kind of the optical disk, optimum seek can be done according to the kind of the optical disk. Now, the kind of the optical disk includes a ROM disk (VD-ROM, DVD-ROM) permitting only read, a write-once disk (CD-R, DVD-R) permitting write only once and a rewritable disk (CR-R/W, DVD-R/W) permitting repeated erasure and write of data.

According to one aspect of the invention, while the number of tracks jumped during seek can be counted appropriately (the maximum speed is not set for the marginal speed), the maximum speed at which the pickup head is moved is being incremented by the first magnitude. For this reason, according to the performance of the components used in the apparatus body, the maximum speed at which the pickup head is moved during seek can be detected and set. Further, if the number of tracks jumped during seek cannot be counted appropriately and the maximum speed stored in the speed information storage device is set for the marginal speed, thereafter even if the number of tracks can be counted appropriately, the seek control device does not execute updating of incrementing the maximum speed stored in the speed information storage device. For this reason, a situation does not occur in which whenever seek is done, the maximum speed at which the pickup head is moved is alternately set between the speed not higher than the marginal speed and the speed higher than the marginal speed. This sufficiently suppresses the frequency of seek failure, thus preventing reliability of the apparatus body from being deteriorated.

BRIEF DESCRIPTION OF THE DRAWINGS

FIG. 1 is a block diagram showing the configuration of the main part of the optical disk apparatus which is an embodiment of this invention.

FIG. 2 is a view showing speed information stored in a speed information storage unit of the optical disk apparatus which is an embodiment of this invention.

DESCRIPTION OF THE PREFERRED EMBODIMENTS

Figure 3:
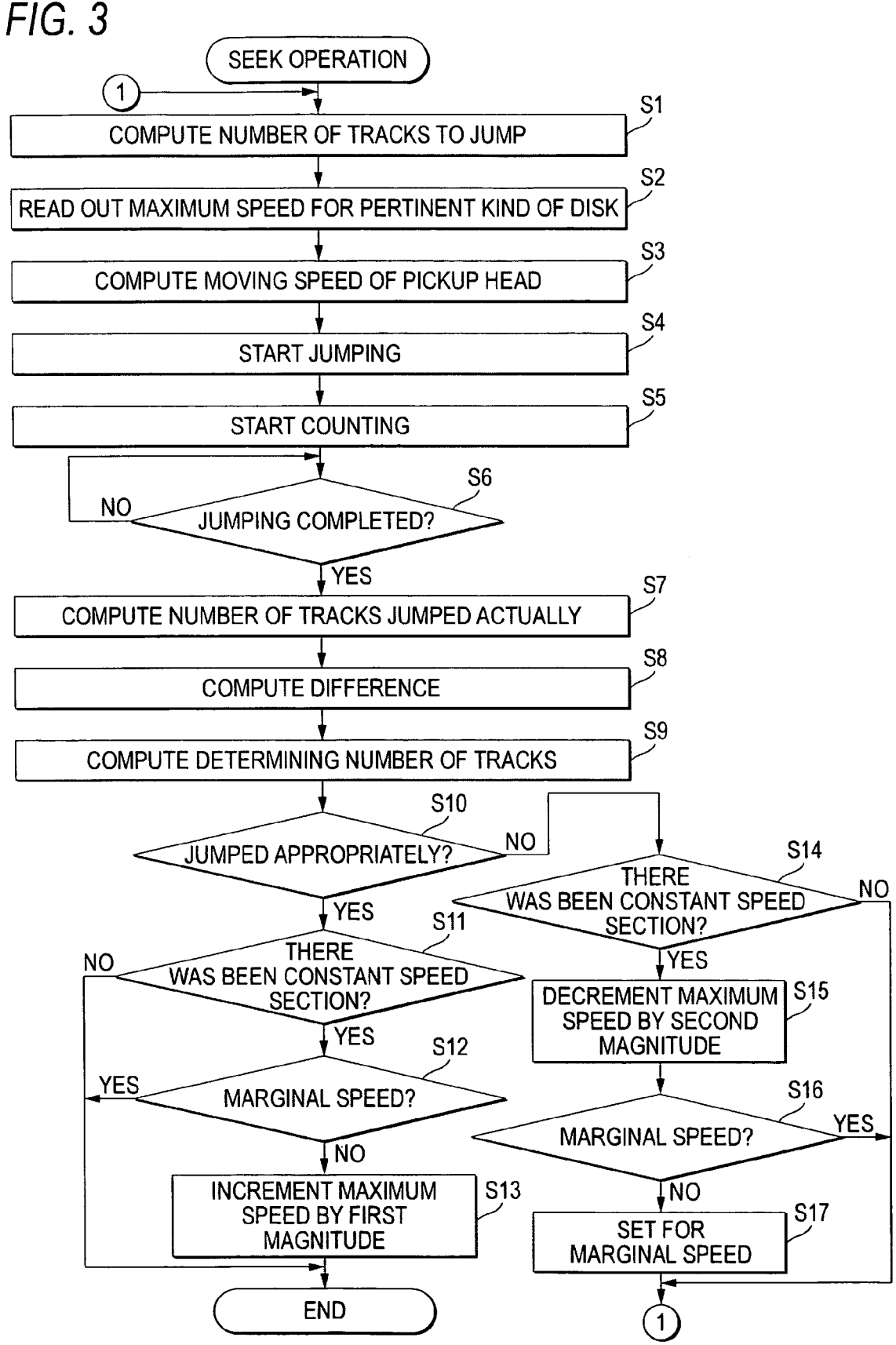
FIG. 3 is a flowchart showing the processing during seek in the optical disk apparatus according to this embodiment.

Now referring to the drawings, an explanation will be given of an optical disk apparatus which is an embodiment of this invention.

FIG. 1 is a block diagram showing the configuration of the main part of the optical disk apparatus which is an embodiment of this invention. An optical disk apparatus 1 which is an embodiment of this invention includes a pickup head 2 for irradiating an optical disk 10 set in the apparatus body with a laser beam; a focus control unit 3 for making focus control of focusing the laser beam on the recording face of the optical disk 10; a tracking control unit 4 for making tracking control of aligning the laser beam with the center of a track of the optical disk 1; an RF amplifier 5 for amplifying an RF signal which is a read signal of the data recorded on the optical disk 10; a reproducing unit 6 for creating and outputting a reproduced signal on the basis of the RF signal amplified by the RF amplifier 5; a seek control unit 7 for controlling the seek operation of jumping a data reading position on the optical disk 10; a speed information storage unit 8 for storing correlated speed information composed of a maximum speed which is an upper limit of the moving speed of the pickup head 2 during seek according to the kind of the optical disk 10 and information indicative of whether this maximum speed is the marginal speed; and a spindle motor 9 for rotating the optical disk 10.

The pickup head 2 is provided with an LD (laser diode) serving as a light source; an objective lens of converging the laser beam emitted from the LD; a two-axis actuator for moving the objective lens in a direction approaching/leaving the optical disk 10 and a radial direction of the optical disk; a four-divided light receiving element for detecting the beam reflected from the optical disk 10, etc. The pickup head 2 is attached to the shaft extending in the radial direction of the optical disk 10 and is rotated in the radial direction of the optical disk 10 by a sled motor (not shown). The pickup head 2 detects the beam reflected from the optical disk 10 using the known four-divided light receiving element to produce a focus error signal (hereinafter referred to as an FE signal), a tracking error signal (hereinafter referred to as a TE signal) and the RF signal. As well known, the FE signal is a signal indicative of a quantity of displacement between the recording face of the optical disk 10 and the in-focus position of the laser beam with which the optical disk 10 is irradiated. The FE signal is supplied to the tracking control unit 4 and seek control unit 7. The RF signal is the read signal of the data recorded on the optical disk 10. The RF signal is supplied to the RF amplifier 5.

The focus control unit 3 creates a focus servo signal on the basis of the FE signal supplied from the pickup head 2, and the focus servo signal superposed on a focus bias to an actuator. Thus, the objective lens attached to the pickup head 2 is caused to move in the direction approaching/leaving the optical disk 10 so that the in-focus position of the laser beam emitted from the LD of the pickup head 2 is aligned with the recording face of the optical disk 10. The tracking control unit 4 creates a tracking servo signal on the basis of the TE signal supplied from the pickup head 2 and supplies it to the actuator. Thus, the objective lens attached to the pickup head 2 is moved in the radial direction of the optical disk 10 so that the irradiating position of the laser beam emitted from the LD of the pickup head 2 is aligned with the center of the track of the optical disk 10. Further, if only moving the objective lens by the actuator cannot irradiate a target track with the laser beam emitted from the light emitting element of the pickup head, the tracking control unit 4 drives the sled motor (not shown) to move the pickup head 3 in the radial direction of the optical disk 10. The RF amplifier 5 amplifies the inputted RF signal and supplies the amplified RF signal to the reproducing unit 6.

The seek control unit 7 controls the sled motor during seek on the basis of the speed information stored in the speed information storage unit to control the movement of the pickup head 2. The speed information storage unit 8, as shown in FIG. 2, stores the maximum speed which is an upper limit of the moving speed of the pickup head 2 during seek and a marginal speed flag indicative of whether this maximum speed is the marginal speed so that they are correlated with each other, for each of a ROM disk (VD-ROM, DVD-ROM) permitting only read, a write-once disk (CD-R, DVD-R) permitting write only once and a rewritable disk (CR-R/W, DVD-R/W) permitting repeated erasure and write of data. When the apparatus body is shipped, the maximum speed of the above speed information is set for an appropriate value, and the marginal speed flag is set for the status indicative of that the maximum speed is not the marginal speed (marginal flag=0). The speed information storage unit 8 is constructed of a non-volatile memory.

An explanation will be given of the operation during seek of the optical disk apparatus 1 according to this embodiment. FIG. 3 is a flowchart showing the operation during seek. The optical disk apparatus 1, when a seek command is inputted, executes this processing. First, the seek control unit 7 computes the number of tracks jumped during the present seek (step s1). In step s1, the number of tracks is computed from the present reading position and a target position that is a jumping destination. The seek control unit 7, after having computed the number of tracks jumped in step s1, reads out the maximum speed stored in the speed information storage unit 8 for the optical disk 10 of the kind set in the apparatus body (step s2). The seek control unit 7 computes the moving speed of the pickup head 2 from the present position to the target position, inclusive of accelerating and decelerating sections (step s3). In step s3, the moving speed of the pickup head 2 from the present position to the target position, inclusive of accelerating and decelerating sections is computed so that it does not exceed the maximum speed read out in step s2.

Figure 4A:
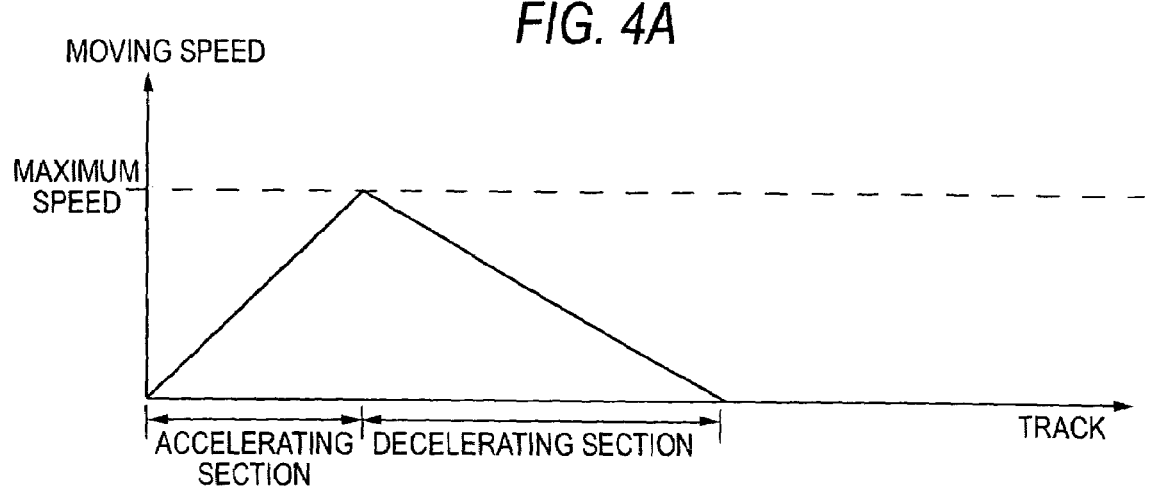
FIGS. 4A, 4B and 4C are graphs for explaining the method for computing the moving speed of the pickup head during seek.
Figure 4B:
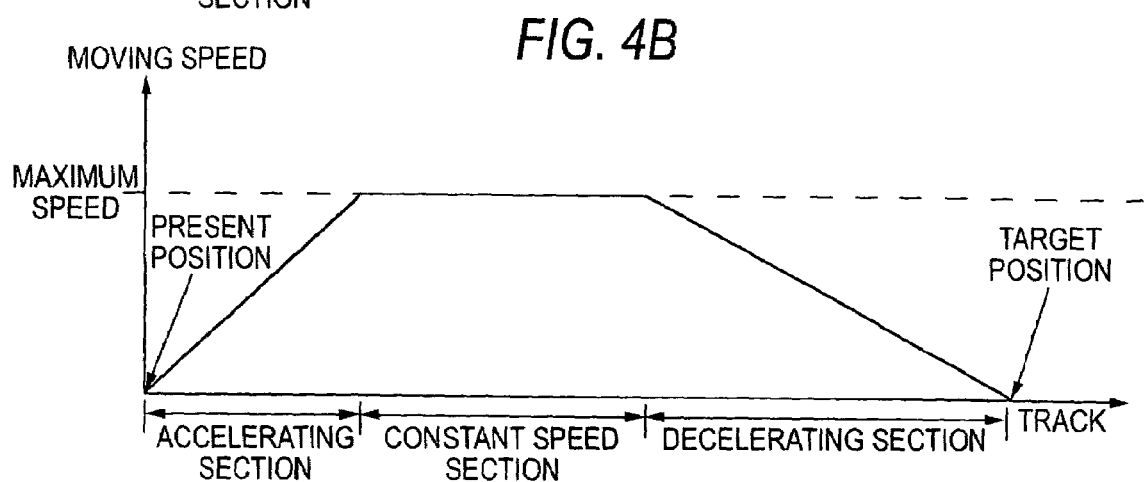
Figure 4C:
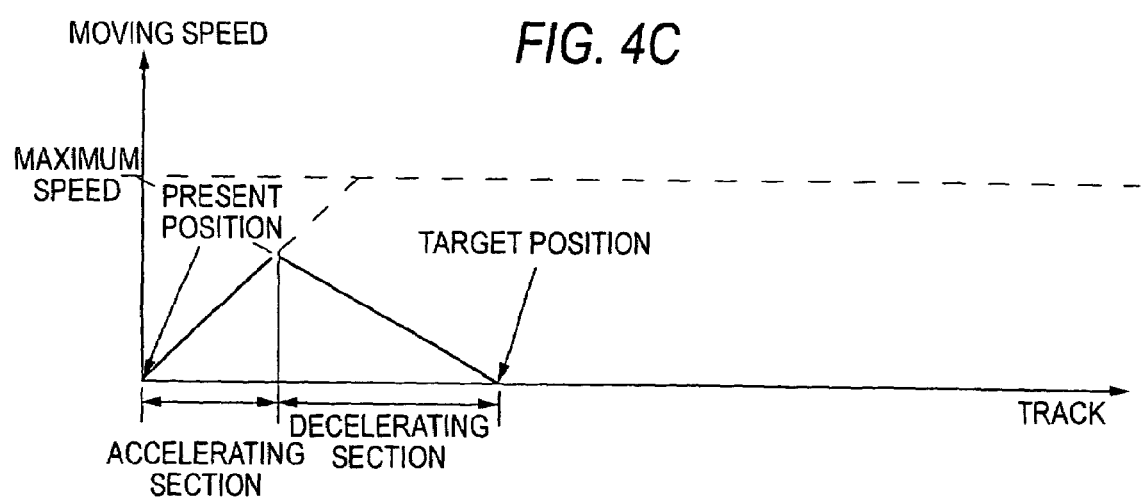

Concretely, as shown in FIG. 4(A), the sum of the number of tracks over which the pickup head 2 moves is computed for the accelerating section over which the moving speed of the pickup head 2 reaches the maximum speed read out in step s2 from the start of seek and for the decelerating section in which the moving speed of the pickup head 2 reaches zero (stops) from the maximum speed read out in step s2. The acceleration in the accelerating section and the deceleration (acceleration in a minus direction) in the decelerating section are previously defined (preset). The acceleration and deceleration may be equal or different in their absolute values. The seek control unit 7, if the sum of the number of tracks moving over the accelerating section and decelerating section is smaller than the number of tracks jumped this time computed in step s1, as shown in FIG. 4 (B), a constant speed section over which the pickup head 2 is moved at the maximum speed read out in step s2 is located between the accelerating section and the decelerating section. And this constant speed is taken as the moving speed of the pickup head 2 from the present position to the target position. On the contrary, if the sum of the number of tracks moving over the accelerating section and decelerating section is equal to or more than the number of tracks jumped this time computed in step s1, as shown in FIG. 4 (C), the seek control unit 7 computes the moving speed of the pickup head 2 from the present position to the target position, which is set so as to start to decelerate before the moving speed of the pickup head 2 reaches the maximum speed read out in step s2 from the start of seek.

The seek control unit 7 drives the sled motor on the basis of the moving speed of the pickup head 2 from the present position to the target position computed in step s3 to start jumping of the pickup head 2 to the target position. When the jumping is started in step s4, the seek control unit 7 starts to count the TE signal, thereby counting the number of tracks over which the pickup head 2 has jumped (step s5). Counting the TE signal is to count the number of individual waves in a substantially sinusoidal wave occurring whenever the pickup head 2 strides across a single track. Actually, the number of zero-crossing points of the TE signal is counted. The seek control unit 7, while the pickup head 2 is moved to the target position, detects the position of the pickup head 2 on the basis of the number of tracks whose counting is started in step s5, and also detects the moving speed of the pickup head 2 by the sled motor on the basis of the counting interval between the zero-crossings of the TE signal, thereby controlling the sled motor so that the pickup head 2 actually moves at the moving speed of the pickup head 2 from the present position to the target position computed in step s3. Thus, the seek control unit 7 controls the moving speed of the pickup head 2 so that it does not exceed the maximum speed read out in step s2.

The seek control unit 7, after having completed the jumping started in step s4 (step s6), on the basis of the position of the pickup head 2 at this time, computes the number of tracks over which the pickup head 2 has actually jumped this time (step s7) and computes a difference (absolute value) from the number of tracks counted this time (step s8). The seek control unit 7 also computes the determining number of tracks which is used for determination of whether or not the present jumping has been done appropriately. The determining number of tracks can be computed by multiplying the number of tracks over which the pickup head has actually jumped this time by a prescribed ratio. This ratio may be the magnitude of e.g. 0.01 to 0.05 or so. The seek control unit 7 compares the difference computed in step s8 and the determining number of tracks computed in step s9 to determine whether the present jumping has been done appropriately (s10). Concretely, if the difference computed in step s8 is not greater than the determining number of tracks computed in step s9, it is determined that the present jumping has been done appropriately. Inversely, if the difference computed in step s8 is greater than the determining number of tracks computed in step s9, it is determined that the present jumping has not been done appropriately.

If it is determined in step s10 that the present jumping has been done appropriately, the seek control unit 7 determines whether or not there has been a constant speed section over which the pickup head 2 was moved at the maximum speed read out in step s2 in this jumping (step s11). If the pickup head 2 has not been moved at the maximum speed read out in step s2 in the present jumping, because it cannot be confirmed in the present jumping whether or not the number of tracks to jump when the pickup head 2 is moved at this maximum speed can be counted appropriately, the seek control unit 7 does not execute the processing relative to updating of the speed information stored in the speed information storage unit 8 described later, but ends the processing.

Incidentally, the optical disk apparatus 1, when having ended the processing shown in FIG. 3, starts reproduction on the target track.

On the other hand, if it is determined in step s11 that there has been the constant speed section over which the pickup head 2 has been moved at the maximum speed read out in step s2 in the present jumping, because it could be confirmed in the present jumping whether or not the number of tracks to jump when the pickup head 2 is moved at this maximum speed can be counted appropriately, the seek control unit 7 determines whether or not the maximum speed stored in the speed information storage unit 8 has been set for a marginal speed for the optical disk 10 of the kind set in the apparatus body (step s11). If the maximum speed has not been set for the marginal speed, the seek control unit 7 updates the maximum speed stored in the speed information storage device 8 to the value incremented by a first prescribed magnitude (step s13), thus ending the processing. If the maximum speed has been set for the marginal speed, without executing the processing in step s13, the seek control unit 7 ends the processing. As described later, if the maximum speed stored in the speed information storage device 8 has been set for the marginal speed, it was confirmed previously that the number of tracks to jump when the pickup head 2 is moved at the speed higher by a second prescribed magnitude than the maximum speed cannot be counted appropriately. Thus, if the maximum speed stored in the speed information storage unit 8 has been set for the marginal speed, in step s13, it is not updated to the value incremented by the first magnitude. For this reason, a situation does not occur in which the maximum speed at which the pickup head 2 is moved is alternately set between the speed not higher than the marginal speed and the speed higher than the marginal speed. This sufficiently suppresses the frequency of seek failure, thus preventing reliability of the apparatus body from being deteriorated. Further, while the number of tracks jumped during seek can be counted appropriately (maximum speed is not set for the marginal speed), the maximum speed at which the pickup head is moved is being incremented by the first prescribed magnitude. For this reason, according to the performance of the components used in the apparatus body, the maximum speed at which the pickup head 2 is moved during seek can be detected and set.

Next, an explanation will be given of the case where it has been determined in step s10 that the present jumping has not been done appropriately. The seek control unit 7 determines whether or not there has been a constant speed section over which the pickup head 2 was moved at the maximum speed read out in step s2 in the present jumping (step s14). The determination in step s14 is identical to that in step s11. If the pickup head 2 has not been moved at the maximum speed read out in step s2 in the present jumping, on the assumption that the reason why the number of tracks jumped this time could not counted appropriately is not that the moving speed of the pickup head 2 is higher than the marginal speed, without executing the processing relative to the updating of the speed information stored in the speed information storage unit 8, the seek control unit 7 returns to step s1 to execute the seek operation again.

On the other hand, if the pickup head 2 has been moved at the maximum speed read out in step s2 in the present jumping, on the assumption that the number of tracks to jump when the pickup head 2 is moved at this maximum speed cannot be counted appropriately, in other words, the maximum speed stored in the speed information storage unit 8 is higher than the marginal speed, the seek control unit 7 updates the maximum speed stored in the speed information storage unit 8 to the value decremented by the second magnitude (step s15). Thus, the maximum speed at which the pickup head 2 is moved in the subsequent et seq seek operation is the speed incremented by the second prescribed magnitude as compared with the present seek. The updating of the maximum speed in step s15 will be done irrespectively of whether or not the maximum speed has been already set for the marginal speed. And if the maximum speed stored in the speed information storage unit 8 has not been set for the marginal speed, the seek control unit 7 sets the maximum speed at the marginal speed (s16, s17) and returns to step s1 to execute the seek operation again.

Thus, in the case where although the number of tracks could be counted appropriately on an earlier occasion even if the pickup head 2 is moved at the present maximum speed, owing to deterioration of the apparatus body, if the pickup head 2 is moved at the present maximum speed, when the number of tracks cannot be counted appropriately, the maximum speed at which the pickup head 2 is moved can be updated appropriately. In other words, the maximum speed when the pickup head 2 is moved can be set according to deterioration of the apparatus body.

Further, the second magnitude may be equal to the first magnitude, but preferably it is smaller than the first magnitude. In this way, the maximum speed of the moving speed of the pickup head 2 stored in the speed information storage unit 8 can be brought close to the level in which the number of tracks cannot be actually done appropriately so that the maximum speed can be set further appropriately.

Further, the optical disk apparatus according to this embodiment, in which the speed information is stored for each of the kinds of the optical disk 10, permits optimum seek according to each optical disk.

What is claimed is:

1. An optical disk apparatus comprising:
   a moving device for moving a pickup head in a radial direction of an optical disk, the pickup head for reading data recorded on the optical disk by irradiating the optical disk set in an apparatus body with a laser beam and detecting the beam reflected therefrom,
   a seek control device for controlling movement of the pickup head by the moving device during seek of jumping a data reading position on the optical disk, and
   a reproducing device for creating and outputting a reproduced signal based on the data read from the optical disk by the pickup head, further comprising
   a speed information storage device for storing speed information composed of information of a maximum speed which is an upper limit of the moving speed of the pickup head during seek and information indicative of that the maximum speed is a marginal speed, both items of information being correlated with each other according to the kind of the optical disk,
   wherein the seek control device counts a number of tracks jumped by using the speed information stored in the speed information storage device according to the kind of the optical disk set in the apparatus body, while the seek control device controls the movement of the pickup head by the moving device so that that the moving speed of the pickup head during seek does not exceed the maximum speed,
   wherein the seek control device acquires a difference between the number of tracks actually jumped when jumping is completed and the number of tracks counted this time,
   wherein, when the difference acquired is smaller than a determining number of tracks computed by multiplying the number of tracks actually jumped by a prescribed ratio, if the pickup head has been moved at the maximum speed during the present jumping, the seek control device updates the corresponding maximum speed of the pickup head stored in the speed information storage device to a speed incremented by a first prescribed magnitude, and
   wherein, when the difference acquired is larger than the determining number of tracks, if the corresponding maximum speed of the pickup head stored in the speed information storage device is not the marginal speed and if the pickup head has been moved at the maximum speed during the present jumping,
   the seek control device updates the corresponding maximum speed of the pickup head stored in the speed information storage device to a speed decremented by a second prescribed magnitude; and
   wherein if the corresponding maximum speed of the pickup head stored in the speed information storage device is not the marginal speed, the seek control device sets the maximum speed for the marginal speed.

2. An optical disk apparatus comprising:
   a moving device for moving a pickup head in a radial direction of an optical disk, the pickup head for reading data recorded on the optical disk by irradiating the optical disk set in an apparatus body with a laser beam and detecting the beam reflected therefrom;
   a seek control device for controlling movement of the pickup head by the moving device during seek of jumping a data reading position on the optical disk, and
   a reproducing device for creating and outputting a reproduced signal based on the data read from the optical disk by the pickup head;
   the apparatus further includes:
   a speed information storage device for storing speed information composed of information of a maximum speed which is an upper limit of the moving speed of the pickup head during seek and information indicative of that the maximum speed is a marginal speed,
   wherein the seek control device counts the number of tracks jumped while controlling the movement of the pickup head by the moving device so that that the moving speed of the pickup head during seek does not exceed the maximum speed stored in the speed information storage device,
   wherein the seek control device acquires a difference between the number of tracks actually jumped when jumping is completed and the number of tracks counted this time,
   wherein, when the difference acquired is smaller than a determining number of tracks computed on the basis of the number of tracks actually jumped, if the pickup head has been moved at the maximum speed during the present jumping, the seek control device updates the maximum speed of the pickup head stored in the speed information storage device to a speed incremented by a first prescribed magnitude,
   wherein, when the difference acquired is larger than the determining number of tracks, if the corresponding maximum speed of the pickup head stored in the speed information storage device is not the marginal speed and if the pickup head has been moved at the maximum speed during the present jumping, the seek control device updates the maximum speed of the pickup head stored in the speed information storage device to a speed decremented by a second prescribed magnitude, and
   wherein, if the maximum speed of the pickup head stored in the speed information storage device is not the marginal speed, the seek control device sets the maximum speed for the marginal speed.

3. An optical disk apparatus according to claim 2, wherein the speed information storage device stores the speed information according to the kind of the optical disk, wherein the seek control device executes the seek using the speed information stored in the speed information storage device according to the kind of the optical disk set in the apparatus body, and the seek control device updates the speed information.

4. An optical disk apparatus according to claim 2, wherein the determining number of tracks is a value computed by multiplying the number of tracks actually jumped by a prescribed ratio.

5. An optical disk apparatus according to claim 3, wherein the determining number of tracks is a value computed by multiplying the number of tracks actually jumped by a prescribed ratio.

* * * * *